United States Patent
Reil et al.

(10) Patent No.: US 10,197,667 B2
(45) Date of Patent: Feb. 5, 2019

(54) METHOD AND SIGNAL GENERATOR FOR SIMULATION OF SEA CLUTTER

(71) Applicant: Rohde & Schwarz GmbH & Co. KG, Munich (DE)

(72) Inventors: Andreas Reil, Tutzing (DE); Steffen Heuel, Munich (DE); Carlo Van Driesten, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 525 days.

(21) Appl. No.: 14/941,407

(22) Filed: Nov. 13, 2015

(65) Prior Publication Data
US 2017/0139038 A1 May 18, 2017

(51) Int. Cl.
*G01S 7/40* (2006.01)
*G01S 7/41* (2006.01)

(52) U.S. Cl.
CPC .......... *G01S 7/4052* (2013.01); *G01S 7/414* (2013.01)

(58) Field of Classification Search
CPC ....... G01S 7/4052; G01S 7/414; G01S 7/4056
See application file for complete search history.

(56) References Cited

U.S. PATENT DOCUMENTS

| | | | | |
|---|---|---|---|---|
| 4,053,886 A | * | 10/1977 | Wright | G01S 7/415 342/192 |
| 4,054,879 A | * | 10/1977 | Wright | G01S 7/415 342/192 |
| 4,748,448 A | * | 5/1988 | Thompson | G01S 13/42 342/26 A |
| 4,866,446 A | * | 9/1989 | Hellsten | G01S 13/90 342/201 |
| 4,965,582 A | * | 10/1990 | Hellsten | G01S 13/90 342/25 A |
| 5,900,835 A | * | 5/1999 | Stein | G01S 7/2922 342/159 |
| 8,159,388 B2 | | 4/2012 | Erkocevic-Pribic et al. | |
| 8,816,899 B2 | * | 8/2014 | Abatzoglou | G01S 13/5244 342/159 |

FOREIGN PATENT DOCUMENTS

CN 102628935 B * 10/2013

OTHER PUBLICATIONS

T. Kadota and F. Labianca, "A mathematical representation of random gravity waves in the ocean," in IEEE Journal of Oceanic Engineering, vol. 5, No. 4, pp. 215-224, Oct. 1980. doi: 10.1109/JOE.1980.1145472.*

(Continued)

*Primary Examiner* — Matthew M Barker
(74) *Attorney, Agent, or Firm* — Lee & Hayes, PC

(57) ABSTRACT

The invention is related to a method and a signal generator for generating a sea clutter simulation signal used as an input signal for a radar system. The method comprises the steps of: modeling of gravity waves using a physical simulation of a sea surface; modeling of capillary waves using stochastic processes; and adding the modeled capillary waves to the modeled gravity waves.

13 Claims, 6 Drawing Sheets

(56) References Cited

OTHER PUBLICATIONS

H. W. Melief, H. Greidanus, P. Hoogeboom and P. van Genderen, "Modeling radar backscatter from breaking waves on the surface," IGARSS 2003. 2003 IEEE International Geoscience and Remote Sensing Symposium. Proceedings (IEEE Cat. No. 03CH37477), 2003, pp. 4189-4191 vol. 7. doi: 10.1109/IGARSS.2003.1295459.*
B. O'Donnell, R. LeBaron, R. Diaz and A. Papandreou-Suppappola, "Physics-based sea clutter model for improved detection of low radar cross-section targets," 2014 IEEE International Conference on Acoustics, Speech and Signal Processing (ICASSP), Florence, 2014, pp. 6830-6833. doi: 10.1109/ICASSP.2014.6854923.*
Totir, F., et al., "Advanced Sea Clutter Models and their Usefullness for Target Detection," MTA Review, 2008. XVIII(3): pp. 1-17.*
D. Walker, "Doppler modelling of radar sea clutter," in IEE Proceedings—Radar, Sonar and Navigation, vol. 148, No. 2, pp. 73-80, Apr. 2001. doi: 10.1049/ip-rsn:20010182.*
M. b. Zhu, J. w. Zou, W. Dong and X. p. Li, "Sea clutter simulation based on sea surface model and two-scale scattering model," IET International Radar Conference 2013, Xi'An, 2013, pp. 1-4. doi: 10.1049/cp.2013.0260.*

* cited by examiner

METHOD AND SIGNAL GENERATOR FOR SIMULATION OF SEA CLUTTER

FIELD OF THE INVENTION

The invention is related to a method for generating a sea clutter simulation signal and a signal generator. The invention is preferably related to a method for generating sea clutter used as an input signal for a radar system to optimize a detection threshold in a radar system.

The term "sea clutter" herein is used for unwanted echoes contained in a radar system signal that are returned by waves at the sea surfaces when the waves are illuminated by the transmitted radar signal intended to detect targets like ships or aircrafts. Detection of small surface targets in a sea clutter environment is a difficult challenge. The amplitude of radar echoes from such targets is weak and is comparable with the amplitude of the radar echoes from the sea. In addition, Doppler-shifted frequencies of targets and sea clutter often overlap. Statistical distribution of sea clutter is difficult to predict. Thus, sea clutter can cause serious performance issues with radar systems.

BACKGROUND OF THE INVENTION

New commercial maritime radar systems require enormous test and certification before being rolled out. It is necessary to certify a radar system for its compliance with the existing requirements. Therefore, current certification procedures include extremely costly, several daylong open sea measurement campaigns. Unfortunately, not all requirements on the sea state are met compulsory during each measurement trail. Because of the long preparation time necessary, time-to-market values can be significantly increased if such a measurement campaign is missed. Nowadays, most of the requirements, like range accuracy and resolution can already be tested in a laboratory using radar target simulators. Others, like the detection of small targets in a sea clutter environment still have to be tested under real sea conditions on site. Disadvantageously, the weather conditions occurring throughout the campaign are neither controllable, nor reproducible.

In the U.S. Pat. No. 8,159,388 B2, a method for filtering sea clutter in a radar echo is described. Therein it is suggested to combine the modeling of sea clutter based on a hydrographic model with later filtering of actual sea clutter, wherein the hydrographic model that is used could describe precisely the evolution in time and scale of the sea surface.

Thus, there is a desire to simulate a well defined sea clutter scenario, since it would be a huge advantage in terms of cost and time during radar system development. It would significantly shorten the measurement campaign and it would also enable radar engineers to conveniently test their newly developed radar hardware and radar software with adaptable environment conditions in a laboratory environment with adaptable environment, such as different weather conditions.

Preferably, the adjustment of a radar detection threshold for detecting small targets in a commercial maritime radar system should be possible in a laboratory environment to avoid costly and time consuming sea measurement campaigns.

SUMMARY OF THE INVENTION

According to a first aspect of the invention, a method for generating a sea clutter simulation signal used as an input signal for a radar system is proposed. The method comprises the following steps: modeling of gravity waves using a physical simulation of a sea surface; modeling of capillary waves using stochastic processes or correlations extracted from recorded data, preferably by using spherically invariant random processes SIRP; and adding the modeled capillary waves to the modeled gravity waves.

In general, the sea surface can be modeled using a two-scale model, making use of the superposition of two different types of waves: capillary waves and gravity waves.

Capillary waves usually have wavelengths in the order of a few centimeters that are caused by local wind gusts. Capillary waves are used to model the roughness of the sea surface.

A constant wind blowing over a longer period of time causes the development of gravity waves. Gravity waves form typically sea surface structure with wavelengths from a few hundred meters down to less than a few meters.

Reflections of the sea surface, caused by a radar signal, are not stationary and the reflected signal therefore also has a Doppler shift.

Statistical modeling of sea clutter without considering correlation properties do not lead to satisfying results comparable to recorded data. The observation of sea clutter data over a plurality of range bins leads to the assumption that the data not only seems to be correlated in time but also in space. Thus, the inventive generation of a sea clutter simulation signal can be split into two main processes:

The modeling of the gravity waves using a physical simulation of the sea surface provides the generation of a spatial correlation that vary slowly. By using a physical simulation as a basis for modeling the gravity waves, it is possible to use input parameters for each weather condition and to adjust the sea clutter simulation signal.

The SIRP might preferably be used to model the fast varying speckle component of the clutter, the capillary waves.

By adding the modeled capillary waves to the modeled gravity waves, it is achieved that the physical model to establish slowly varying spatial correlations, is combined with the stochastic processes for fast changes.

Thus, by modeling of gravity waves using the physical simulation of a sea surface, it is possible to simulate large areas of the sea surface with gravity waves passing from any desired direction. The inventive idea is to use this physical model to establish slowly varying spatial correlations, wherein the stochastic process is useful for modeling the fast varying component of sea clutter.

The generated sea clutter simulation signal can now preferably be used as an input signal for each radar system regardless its type, RF-parameters and so on, since a correlated noise signal is produced that can be applied to each radar system.

Thus, it is not necessary to measure the sea clutter for a specific radar system by mounting the radar system on a ship and to adjust the threshold value for detecting targets based on a specific weather condition under real sea conditions on site.

In a preferred implementation form of the first aspect of the invention, the sea clutter simulation signal is K-distributed.

A K-distribution function can be used to precisely model the probability density function, PDF, of sea clutter. Thus, sea clutter is usually modeled using a K-distribution. Its probability density function, PDF, can be written as:

$$f(x) = \frac{2c}{\Gamma(v)} \cdot \left(\frac{cx}{2}\right)^v \cdot K_{v-1} \cdot (cx) \qquad (1)$$

with shape parameter v and scale parameter c. $K_{v-1}$ represents the modified Bessel function of the third kind of order v−1 and Γ is the Gamma function. Proper shape parameter v and scale parameters c for the K-distribution are found with the help of the radar parameters and the environmental conditions. Equivalently to the wave movements of the sea, the samples need to follow a certain correlation in time and space to properly simulate sea clutter effects.

Sea state is a term used here for classifying the roughness of the sea, where wind speed and wave height are considered to be dependent. As soon as the wind starts blowing at a certain speed, a finite amount of time is needed for the waves to reach a distinct mean height.

The shape parameter v might range from values between 0.1 and 20, from very spiky, to approximately Rayleigh-distributed data. With the shape parameter v the scale parameter c can be predicted as follows:

$$C = \sqrt{\frac{4v}{P_t \cdot G_t \cdot \frac{\lambda^2 \cdot f^4}{(4\pi)^3 \cdot R^3} \cdot \left(\sigma \cdot \theta_{3dB} \cdot \frac{c_0 \cdot t_p}{2}\right)}} \qquad (2)$$

wherein $P_t$ is the transmitted power at the receiver; $G_t$ is the transmitter gain; λ is the radar wavelength; f is the two-way antenna pattern value at the surface; R is the slant range, $\theta_{3dB}$ is the antenna beam width; $t_p$ is the pulse length; $c_0$ is the speed of light and $\sigma_0$ is the mean clutter reflectivity value, calculated using existing models.

In another implementation form of the first aspect of the invention, the modeling of the gravity waves comprises a transformation of arbitrary distributed variables using a memoryless-nonlinear-transformation, MNLT.

An algorithm extracts the estimated backscatter from the simulated ocean surface. The output of a physical simulation is per se neither K- nor Chi-distributed. To apply an MNLT leads to a transformation of arbitrary distributed, correlated random numbers into any other distribution. Thus, the output of the physical simulation procedure can be used as basis for the underlying correlation of sea clutter. E.g. using any programming language, uniformly distributed, uncorrelated random samples are generated using a random numbers generator. Those uniformly distributed numbers are reshaped to follow the desired probability density function, preferably the K-distribution using the MNLT. A correlated sea clutter simulation signal is thus achieved.

Thus, using the MNLT corrected realization of random numbers into any other distribution is preferably obtained and an underlying correlation of sea clutter is achieved.

The advantage of such a MNLT combined with a physical model is that the actual spatial correlation function of the sea clutter does not have to be precisely known. The decorrelation of the fast varying speckles is obtained within a few milliseconds but the correlation function for the underlying mean level is not defined yet for varying sea conditions. Thus, using the MNLT, the generated mean level can be fit into any desired distribution function.

In another preferred implementation form of the first aspect of the invention, the MNLT transfers the arbitrary distribution variables into Chi-distributed variables.

The desired K-distribution preferably consists of an underlying mean level obeying a Chi-distribution and a Rayleigh distributed speckle component. When transforming the arbitrary distributed variable into a chi distribution, an estimation of the underlying mean level of the sea clutter returns is determined.

In another preferred implementation form of the first aspect of the invention, the SIRP are applied on random-generated I/Q data.

For the modeling of capillary waves, uncorrelated I/Q samples can preferably be used as input data. The SIRP are then used to generate the short term correlated speckles of sea clutter. With the help of the SIRP, the correlations of the fast-varying speckle components can be preserved.

In another preferred implementation form of the first aspect of the invention, the sea clutter simulation signal is provided in form of a time-domain I/Q data signal.

Thus, the sea clutter simulation signal can be used as an I/Q baseband signal that represents the sea clutter as a correlated noise signal. The sea clutter simulation signal can then preferably be applied to an RF (radio frequency) frontend to generate any desired radar system by applying RF modulation and/or coding schemes. The generation of the desired radar signal can be achieved by a signal generation unit in a radar system or by a signal generator device.

In another preferred implementation form of the first aspect of the invention, the time-domain I/Q data are used as input data for a radar system to simulate the sea clutter. It can thus be applied to each radar system regardless of the type of radar or any technical realization of this specific radar. The values $P_t$, $G_t$, λ, f, R, $\theta_{3dB}$ and $t_p$ of equation (2) are then preferably set according to the sea clutter generation.

In another preferred implementation form of the first aspect of the invention, at least one input parameter for generating adapted sea clutter simulation signal is applied to the physical simulation, wherein the input parameter preferably are a wave height, a wave period, a range resolution and/or a sampling rate. Thus, each weather condition can be simulated and the generated sea clutter is adjusted to the simulated weather condition. This is advantageous in that no additional time- and cost-consuming data recording under real conditions on site have to be processed.

According to a second aspect of the invention, a signal generator for generating a sea clutter simulation signal according to the previously described manner is proposed. The signal generator comprises input means configured to obtain input parameters for adapting the sea clutter simulation signal. The signal generator further comprises processing means that is configured to model the gravity waves using a physical simulation of a sea surface based on the obtained input parameters. The processing means is further configured to model capillary waves using stochastic processes, preferably SIRP. The processing means is further configured to add the modeled capillary waves to the modeled gravity waves to generate the sea clutter simulation signal. The signal generator further comprises an output means to provide the sea clutter simulation signal as a time-domain I/Q data signal.

In a preferred implementation form of the second aspect, the processing means is configured to transform arbitrary distributed variables using an MNLT into chi-distributed variables. Thus, the desired distribution with pre-served correlation properties is obtained and thus a correlated modeling is achieved.

In a preferred implementation form of the second aspect, the SIRP is based on correlated I/Q data.

In a preferred implementation form of the second aspect, the output means provide the time-domain I/Q data signal that is used as an input signal to a radar system.

To detect small targets it is necessary to adjust the threshold detection value of the radar detection circuitry which can be achieved using the simulated sea clutter signal with different input parameters to simulate different weather conditions and to figure out whether the radar system can detect small targets independent on real weather condition. Since the system can now be applied in laboratory environment it is not necessary anymore to mount the radar system on a ship and adjust the threshold value in the physical environment. Thus, it is not necessary to provide a whole radar system to adjust a threshold detection range of the radar system and it is further not necessary to measure the sea clutter under real conditions on site.

In another preferred implementation form of the second aspect, the input means is a graphical user interface that is used to set the input parameters.

In another preferred implementation form of the second aspect, the processing means is further configured to obtain control data to adjust different modes of the sea clutter simulation signal, preferably wherein the modes is an uncorrelated sea clutter mode, a single range bin mode, a single azimuth angle mode or a spatial simulation mode.

In another preferred implementation form of the second aspect, the generated time-domain I/Q data signal is RF-modulated based on radar system input parameter, preferably a transmit power, a radar wavelength, an antenna beam width, a pulse length, a slant range, a transmitter gain and/or a radar mode.

The signal generator according to the second aspect, especially of any preferred implementation form thereof, achieves all advantages described above for the method according to the first aspect and any of its preferred implementation forms.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by eternal entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

In the following, exemplary embodiments of the invention are described with reference to the drawings. Those exemplary embodiments do not limit the scope of the invention. The same reference signs in different drawings indicate the same elements or at least the same functions unless otherwise stated. In the drawings.

DETAILED DESCRIPTION OF THE PREFERRED EMBODIMENTS

Figure 1:
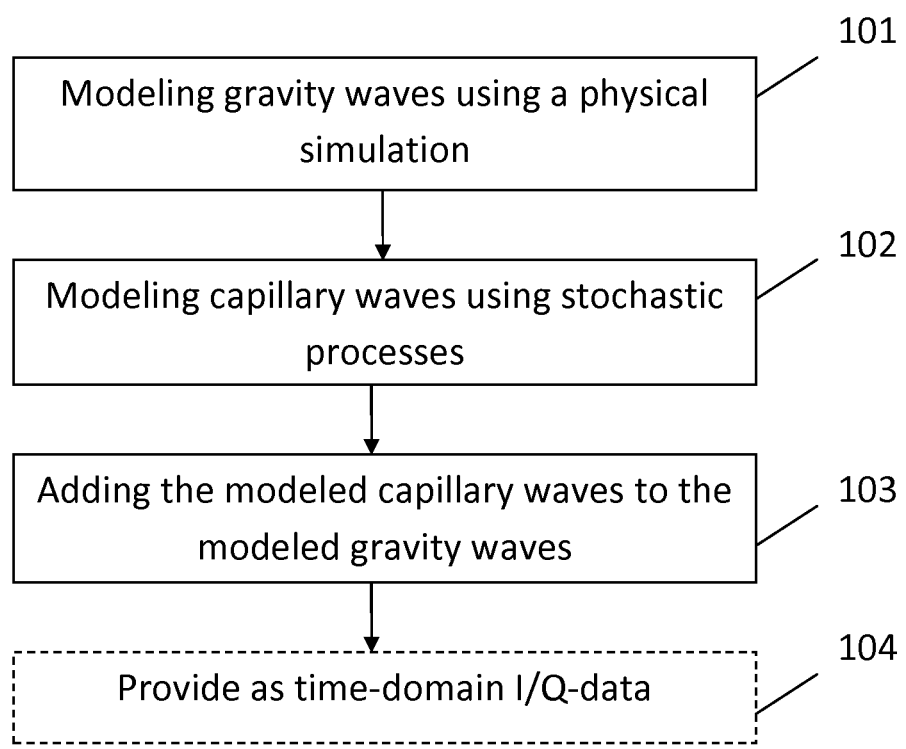
FIG. 1 shows a flow chart of a basic embodiment of a method for generating a sea clutter simulation signal according to the invention.

In FIG. 1 a basic embodiment of a method 100 according to the invention is shown. The method 100 comprises three method steps. According to step 101 a modeling of gravity waves using a physical simulation is processed. According to step 102 the modeling of capillary waves using stochastic process, preferably SIRP is processed. In step 103, the modeled capillary waves are added to the modeled gravity waves to obtain the sea clutter simulation signal.

Using this inventive method 100 allows the simulation of sea clutter based on a two-component simulation. The capillary waves usually have a wavelength of a few centimeters, wherein the gravity waves usually comprise a wavelength from a few hundred meters down to less than several meters.

Sea clutter is dependent on the actual/simulated weather condition which is expressed by the average wave height, the wind speed, the wind direction, the wave propagation speed and swells direction. Those parameters are subsequently referred to as input parameters 2'.

Additionally, the sea clutter is dependent on the radar system configuration itself, such as the transmitted power at the receiver $P_r$; the transmitter gain $G_t$; the radar wavelength $\lambda$; the two-way antenna pattern value f at the surface; the slant range R; the antenna beam width $\theta_{3dB}$; the pulse length $t_p$ and the mean clutter reflectivity value $\sigma_0$. Those parameters are subsequently referred to as RF input parameters 2".

Additionally, the simulated sea clutter is dependent on the simulation environment, such as mesh-grid range, range-resolution and sampling rate.

A physical simulation model is used to generate an artificial sea surface, which are mainly the gravity waves.

Additionally, capillary waves are generated using stochastic models. E.g. SIRP can be used to generate short-term correlated speckles of the sea clutter that are added to the gravity waves.

The method according to FIG. 1 comprises the optional step 104 in which the generated sea clutter simulation signal is provided as a time-domain I/Q data signal. Thus, a sea clutter signal is provided as I/Q baseband signal that can be added to each radar system simulation. So, no time-consuming and cost-efficient measurements under real conditions are necessary and the radar system can be tested and adjusted under laboratory environment.

Figure 2:
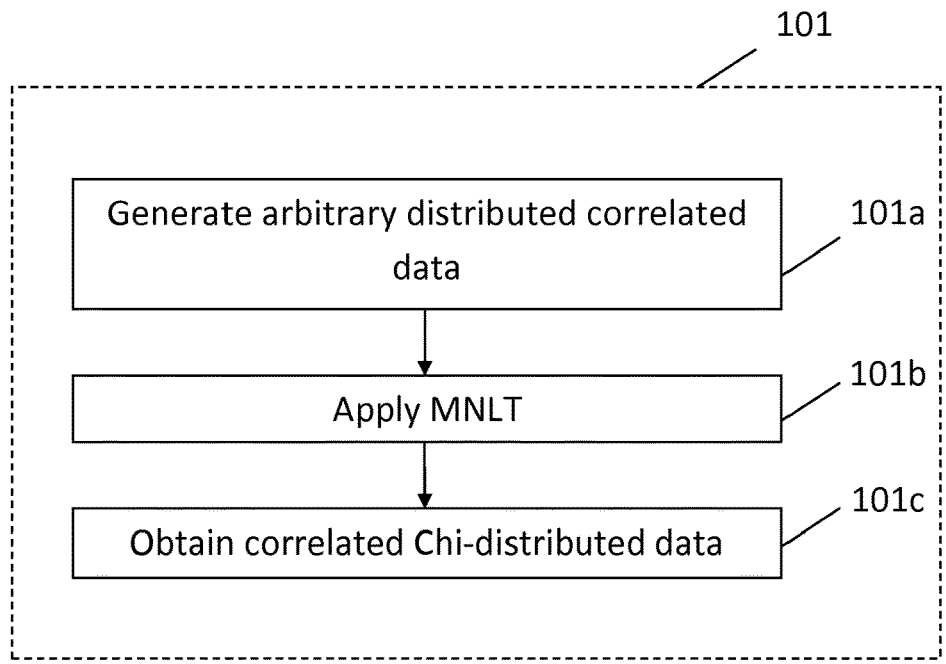
FIG. 2 shows a flow chart of a specific embodiment of the modeling of gravity waves according to the invention.

Now referring to FIG. 2, the method step 101 for modeling the gravity waves using a physical simulation is described in greater details. According to step 101a, arbitrary distributed correlated data are generated. In step 101b an MNLT is applied. In step 101c, correlated chi-distributed data are obtained.

In step 101a, arbitrary distributed correlated data are generated based on a physical model. This model obtains input parameters 2' and is adjusted by simulation parameters.

Using this physical model according to step 101a, sea surfaces of arbitrary dimensions or resolutions can be generated by adjusting the simulation parameters. For the envisaged application, a range resolution higher than the radar range or azimuth resolution is not necessary.

A generated sea surface mesh can have arbitrary dimensions. The wave height, wave direction and a wave period as well as a spreading factor can be generically edited and used as input parameters 2' to generate the gravity waves.

Increasing the mesh leads to a decrease of spatial resolution which is similar to changing the range in azimuth resolution of the radar. If the range resolution of the radar is low, a low resolution model of the sea surface is sufficient for extraction of correlation properties. The spreading factor might be changed to adapt different sea states or locations. It can be use to distinguish between wind- and swell-dominated sea. Increasing a swell parameter leads to an increase of the correlation length of the spatial correlation.

Secondly, input parameter 2' for simulating the gravity waves are applied to simulate specific weather conditions. E.g. the physical simulation obtains the wave height and the wave period as input parameter 2'. Usually, a variation of the wave period comes along with adjusting the wave height, as higher waves do have longer periods in general. In case a single range bin is selected as a radar-simulation mode, the correlations caused by the simulated waves passing through the bin are clearly visible. Thus, the generated sea surface can be correlated in three dimensions, such as is x and y direction as well as a time domain. The method according to FIG. 2 can be used to simulate sea surface of long-term correlations of sea clutter, such as gravity waves.

According to step 101b, a MNLT is applied. Since the physical model provides arbitrary distributed variables only and the sea clutter is usually K-distributed, it is necessary to adapt the PDF using the MNLT. The MNLT converts the arbitrary distributed variables into Chi-distributed variables.

All absolute values are not derived from a certain sea state and it is not mentioned how two values alter with modified sea conditions. The principle behind the MNLT process is to allow the independence of the input data and the output data and their correlation. It can be generally described as of cumulative distribution sampling and an inverse sampling method.

The MNLT procedure itself does not introduce any kind of correlation, but if the input samples are correlated, the output samples are correlated as well. Thus, according to step 101c, in FIG. 2, Chi-distributed mean values are obtained by modeling the gravity waves as based upon a physical simulation of the sea surface, which is transformed to follow a desired distribution with the help of the MNLT.

Within the simulation process, the wave height, wave period, range resolution and the sampling rate can be adjusted to adapt to various radars and sea conditions. When transforming the height of the generated sea surface into a chi-distribution, an estimation of the underlying mean level of the sea clutter returns is determined.

Figure 3:
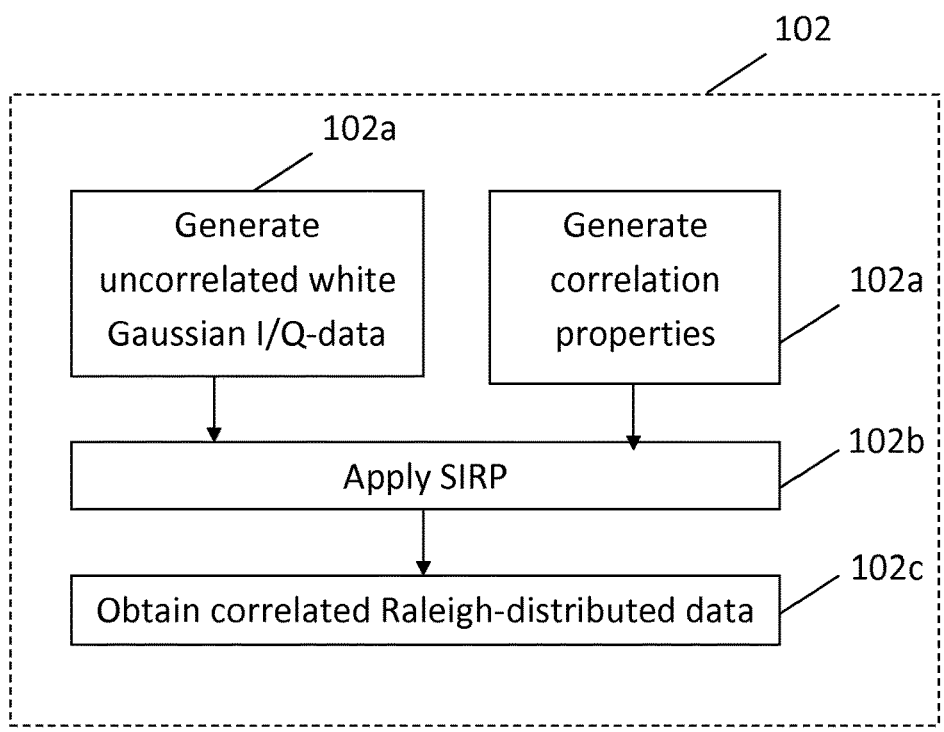
FIG. 3 shows a flow chart of a specific embodiment of the modeling of capillary waves according to the invention.

Now referring to FIG. 3, the method step 102 is described in greater detail. Therein, according to step 102a, I/Q data and correlation properties are generated. In step 102b, SIRP are applied and according to step 102c, correlated Rayleigh-distributed data are obtained.

The SIRP function is used to generate the capillary waves as the short-term speckles of the sea surface. The SIRP need I/Q samples as inputs. With the help of the SIRP, the correlations of the fast-varying speckle components can be preserved. If no radar records are available, the shape parameter v of the appropriate K-distribution can be estimated and Rayleigh-distributed noise modeling the capillary components can be added accordingly.

The output of the earlier mentioned physical simulation is neither K nor Chi-distributed. With the ability of the MNLT to transform arbitrary distributed, correlated realizations of random numbers into any other distribution, the output of the physical simulation procedure can be used as a basis for the underlying correlation of the sea clutter.

Figure 4:
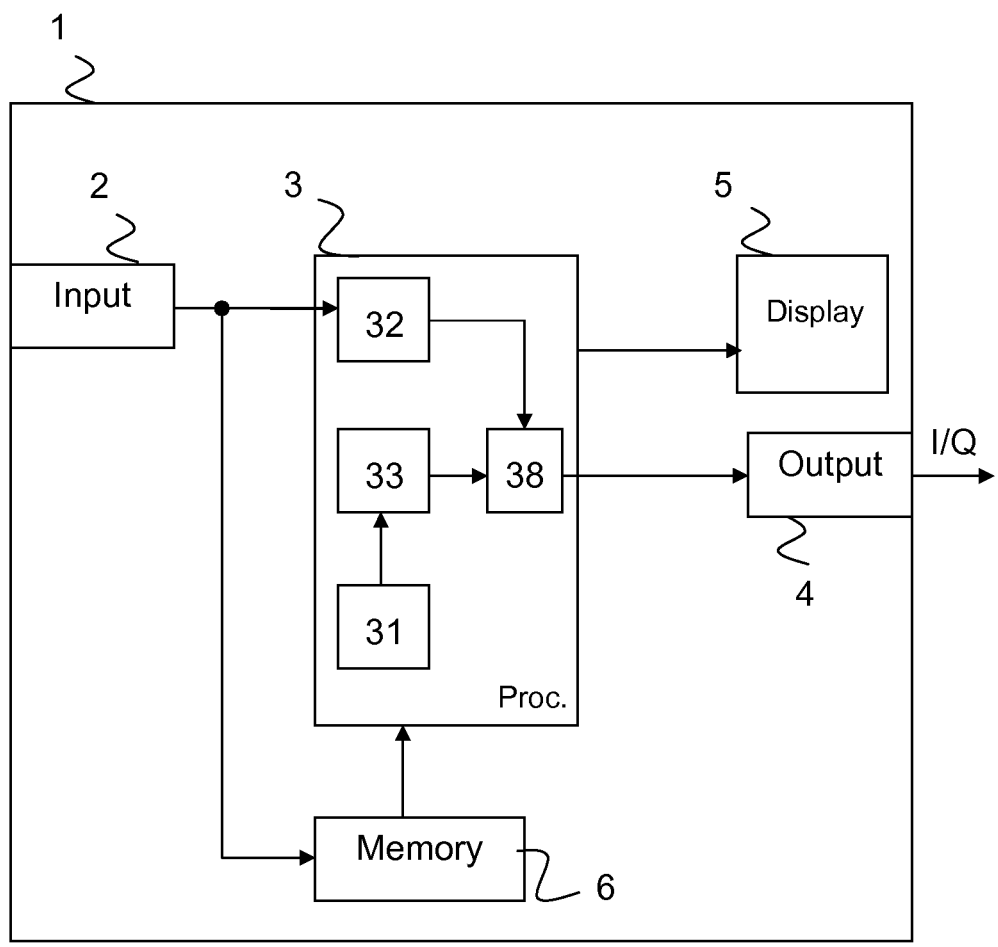
FIG. 4 shows a block diagram of a first exemplary embodiment of a signal generator according to the invention.

In FIG. 4, a first exemplary embodiment of a signal generator 1 according to the invention is shown. The signal generator 1 comprises an input means 2 on which input parameters 2' can be applied. The input means 2 might be a graphical user interface, GUI, on which the wave period, wave height and further conditions as input parameters 2' can be inputted to adjust the physical model for simulating gravity waves according to step 101.

These input parameters 2' provided on input means 2 are provided to a processing means 3 of the signal generator 1. These input parameters 2' are used to model the gravity waves using a gravity wave generator 32. In parallel or subsequently, uncorrelated I/Q dated are generated using a random generator 31. The generated I/Q data are provided to a capillary wave generator 33. The capillary wave generator 33 is configured to process the method step 102 according to FIG. 3. The gravity wave generator 32 according to FIG. 4 is configured to process the method step 101 according to FIG. 2.

The processing means 3 according to FIG. 4 comprises a combining means 38 in which the generated capillary waves and the generated gravity waves are added. Thus, a sea clutter simulation signal is obtained that comprises K-distributed variables.

The sea clutter signal is provided to an output means 4 of the signal generator 1. The sea clutter simulation signal is a time-domain I/Q data signal and can now be used to adjust any radar system. Additionally, a display unit 5 and a memory unit 6 might be incorporated into the signal generator 1 to display generated data and to buffer data already generated.

The I/Q data representing the sea clutter simulation signal can now be used as an input parameter for any arbitrary radar system. Additionally and not shown in FIG. 4, the signal generator 1 can further comprise a radio frequency modulation unit 8 in which additional RF input parameters 2" can be adjusted to provide a radar signal for generating a specific radar signal with these RF input parameters 2". The RF input parameters 2" might be such as the transmitted power at the receiver $P_r$; the transmitter gain $G_r$; the radar wavelength $\lambda$; the two-way antenna pattern value f at the surface; the slant range R; the antenna beam width $\theta_{3dB}$; the pulse length $t_p$ and the mean clutter reflectivity value $\sigma_0$.

Figure 5:
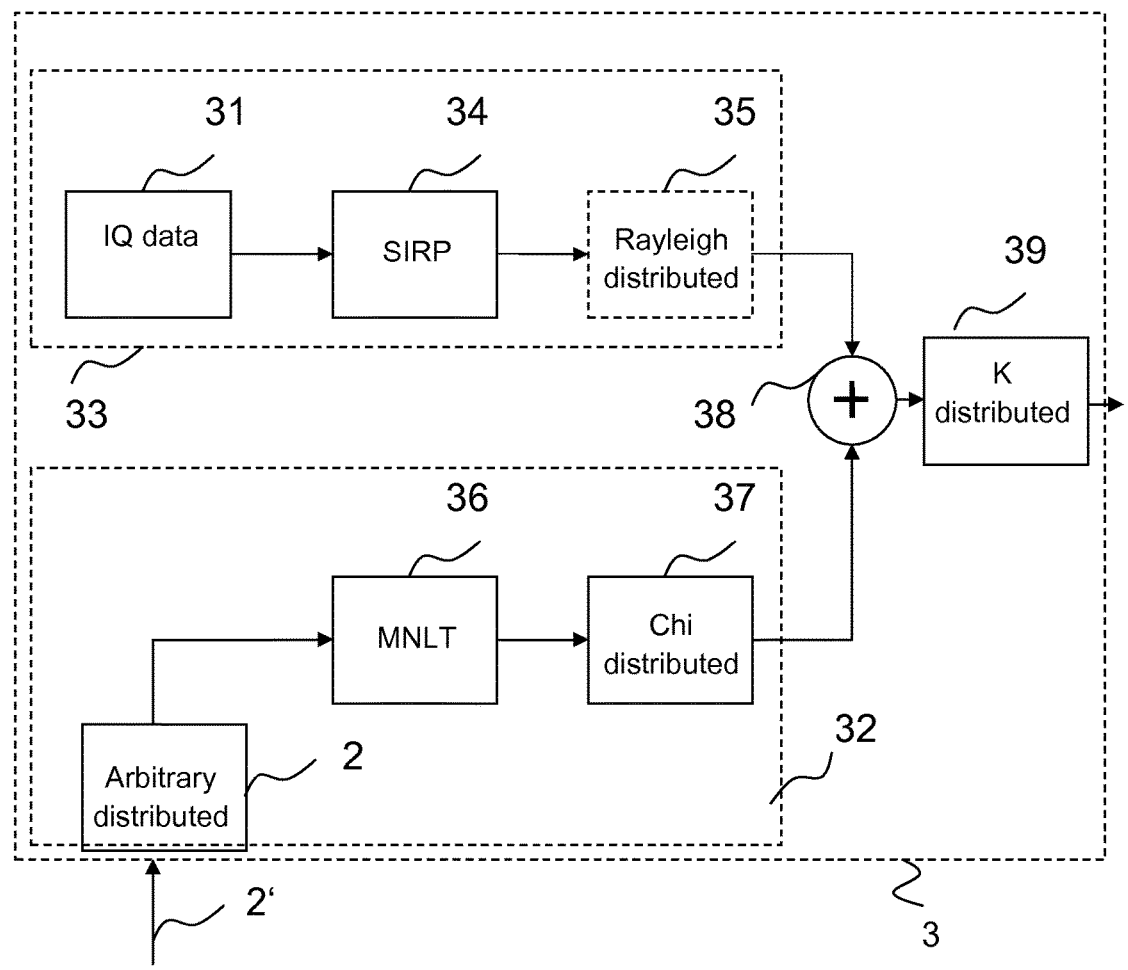
FIG. 5 shows a block diagram of an exemplary embodiment of a processing unit of the signal generator according to the invention.

In FIG. 5, an embodiment of the processing means 3 in the inventive signal generator 1 is shown. Therein, the capillary wave generator 33 and the gravity waves data generator 32 are shown in greater details. The capillary waves generator 33 comprises a I/Q data generator 31 and a SIRP unit 34. The output of the capillary wave generator 33 provides Rayleigh-distributed data that are provided to the adding means 38.

The gravity waves generator 32 obtains input parameters 2' from the input means 2 on which basis arbitrary distributed data are generated that represent gravity waves. Those gravity wave data are arbitrary distributed which would not help to simulate a correlated sea clutter signal. The arbitrary distributed data obtained from the physical model is provided to an MNLT unit 36 to obtain Chi-distributed data 37. The output of the gravity waves generator 32 is provided to another input of the adding means 38. The combination of the output of the gravity wave generator 32 and the output of the capillary wave data generator 33 provides K-distributed data at unit 39, wherein the data is a time-domain I/Q data that is provided to the output means 4 of the signal generator 1.

Figure 6:
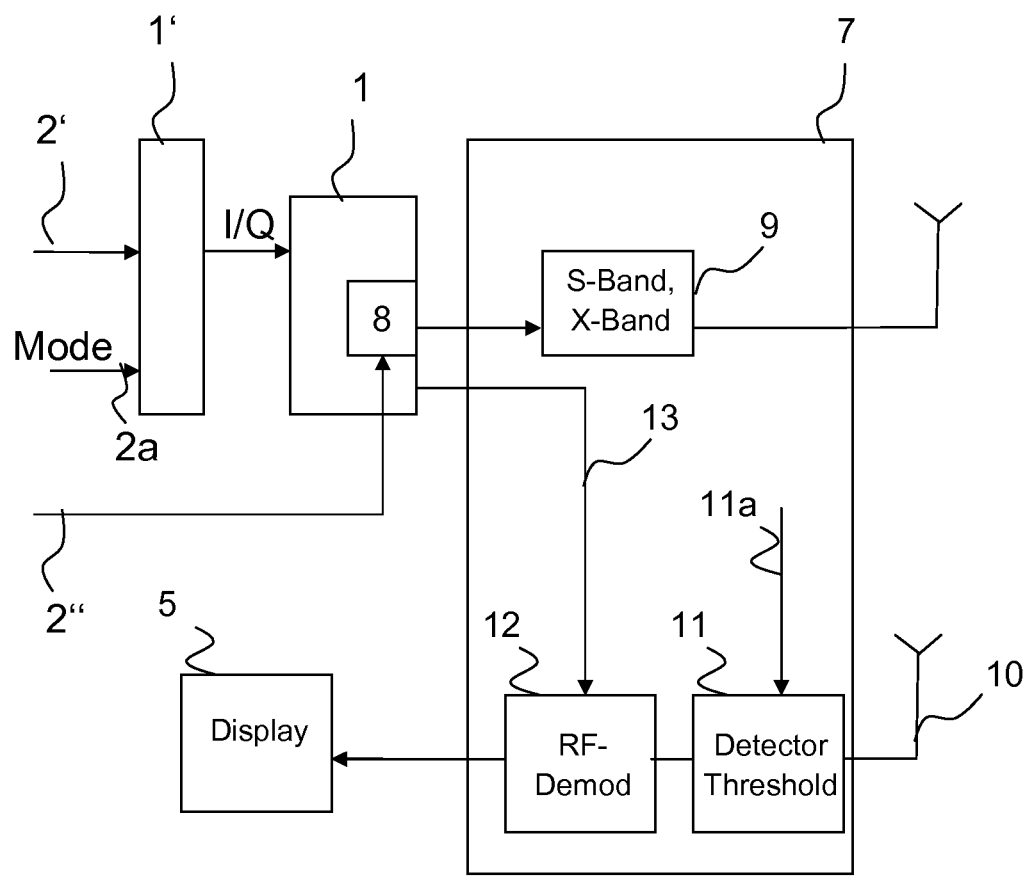
FIG. 6 shows a block diagram of a first exemplary embodiment of a system for adjusting the radar system threshold value according to the invention.
Figure 7:
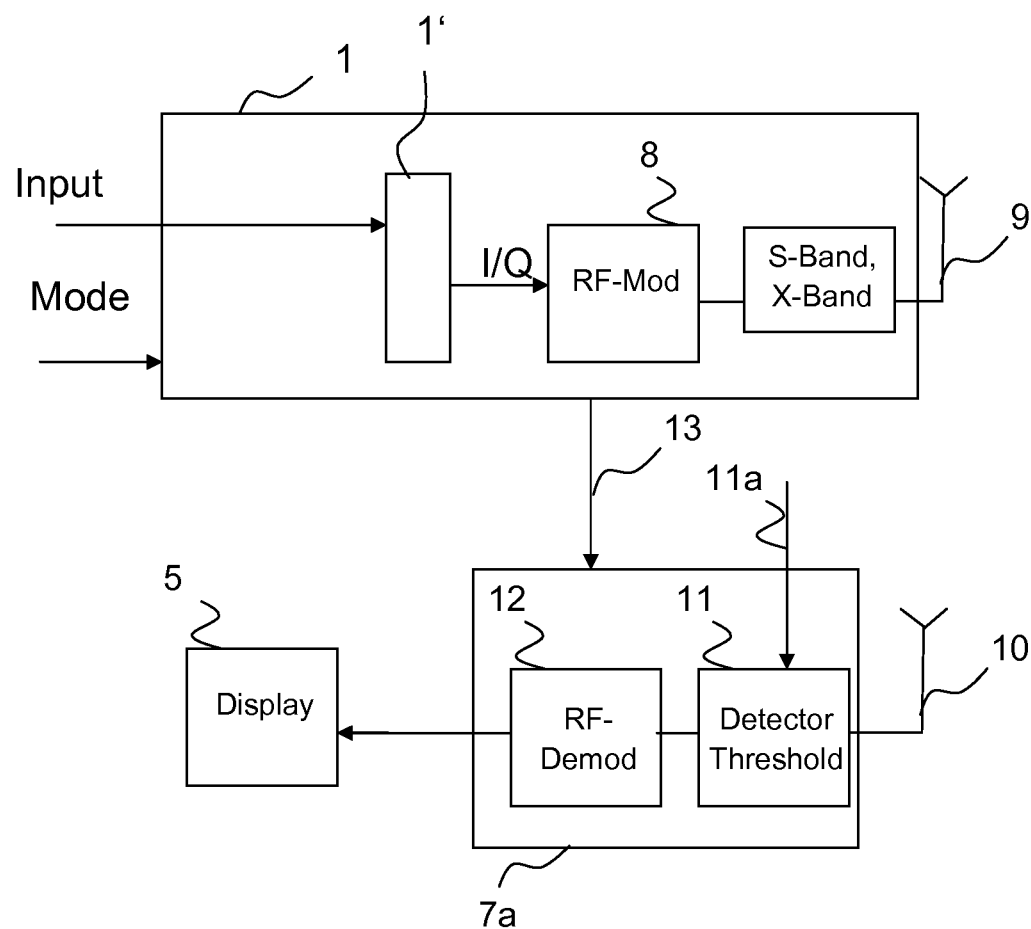
FIG. 7 shows a block diagram of a second exemplary embodiment of a system for adjusting the radar system threshold value according to the invention.

The invention proposes a threshold detection and threshold adjustment of a radar system 7 by following system requirements as shown in FIG. 6 and FIG. 7.

In principle, the range of an object can be obtained by the time $\Delta t$ in between the signal transmission and reception. The radar might operate in two operating modes, pulsed radar or continuous wave, CW, radar. Pulsed radar transmits short RF pulses and analyzes the return echoes. Using a CW radar, the measure Doppler frequency shift can be exploited in order to evaluate the object's speed.

If the returned echo is recorded over several thousand samples, a probability density function of the estimated radar cross section of each range cell can be generated. In case of radar, unwanted reflections caused by sea clutter should be avoided. The inventive concept is to generate a realistic sea clutter simulation signal using only little resources.

In FIG. 6, a first exemplary embodiment of a system to adjust a radars detection threshold is shown. A sea clutter simulation unit 1' comprises an input terminal 2 on which input parameter 2' are provided. The sea clutter simulation unit 1' thus comprises a processing unit 3 as explained in FIG. 5. The sea clutter simulation unit 1' might alternatively be incorporated into the signal generator 1.

The time-domain I/Q data are provided from the sea clutter simulation unit 1' to the signal generator 1. The signal generator 1 obtains a RF-modulation unit 8 which generates a specific RF signal that represents the radar signal. Therefore the RF modulation unit 8 obtains the above mentioned RF input parameters 2". An antenna 9, of the (simulated) radar system 7 provides the generated RF signal for example via S-Band or X-band antenna 9. A receiving antenna 10 obtains the echoed radar signal for adjustment purposes. Therefore, a detectors threshold unit is adjusted via a threshold adjustment signal 11a. A RF-demodulation unit 12 and a display unit 5 (external or internal from the radar system 7 or the signal generator 1) displays the detection result on which basis it is determined whether small targets could be detected or not.

The signal generator 1 also provides marking signals 13, such as azimuth marker and head marker to the radar system 7 in order to generate azimuth information for mechanical and legacy radar systems. Phase coherent signal generation with multiple RF sources can be used to simulate the direction of a signal for digital beam-forming radars.

The receiving antenna 10 obtains echoes of radar signal from antenna 9. A detection threshold 11 detects the targets to be observed and therein the filtering of Doppler frequency and other radar-specific noises are deleted. The output of the detection threshold 11 is provided to a RF demodulation unit 12. The output of the RF demodulation unit 12 is provided to a display unit 5 to show detected target on the screen. Therefore marking signals 13 are provided, such as azimuth marker or head marker, to detect the target correctly.

The signal generator 1 further comprises a mode terminal 2a. The mode input signal is used in the processing means 3 to simulate different scenarios of the sea clutter.

In a first mode, uncorrelated sea clutter is provided by the sea clutter simulation unit 1'. In the uncorrelated mode uncorrelated sea clutter on a given RF input parameter 2" and input parameters 2' is generated.

Another mode is the single range mode. Therein a physical sea surface is simulated and a correlated time series of a single range bin is produced. This feature is helpful in case only a single sea clutter cell is needed.

A further mode is the single azimuth mode. Therein, sea clutter is simulated as it is received by the radar antenna 10 recording the exact same direction throughout the whole simulation. It can be used to detect small objects in sea clutter and adapt the detector threshold 11 of the radar system 7.

Another mode is the spatial simulation mode. The spatial simulation mode is used to generate a spatially correlated time series of radar backscatter. A radar spinning with a distinct speed or a radar using beamforming methods can thus be supplied with samples of correlated clutter in real time.

All data provided by the signal generator 1 are time-domain I/Q data that are provided to the radar system 7. The radar system 7 comprises the RF modulation unit 8 which uses radar-specific input parameters such as frequency, pulse length or slant range to generate an RF signal at the transmit antenna 9 of the radar system 7.

In FIG. 7 another embodiment of the system for adjustment of the radar system 7 is shown, in which the components for generating the specific radar signal, such as sea clutter, RF-modulation, mode-setting are obtained by one single signal generator 1 that incorporates all needed units 1' and 8. The marking signal 13 is provided to a receiving section 7a of the radar system 7 to adjust the detection threshold.

New maritime radar system can now be tested with simulated sea clutter environment to verify developed algorithms without the necessity of open sea campaigns. The invention proposes the creation of a three-dimensional correlated sea clutter without the need to use open sea campaigns. All features of all embodiments described, shown and/or claimed herein can be combined with each.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method for optimizing a detection threshold in a radar system comprising:
    generating a sea clutter simulation signal, the generating comprising the following steps:

modeling of gravity waves using a physical simulation of a sea surface;
modeling of capillary waves using stochastic processes; and
adding the modeled capillary waves to the modeled gravity waves, wherein the sea clutter simulation signal comprises a time-domain I/O data signal, and
inputting the I/Q-data signal into a RADAR system to simulate sea clutter.

2. The method according to claim 1, wherein the sea clutter simulation signal is K-distributed.

3. The method according to claim 1, wherein the modeling of the gravity waves comprises a transformation of arbitrary distributed variables using a memoryless-nonlinear-transformation, MNLT.

4. The method according to claim 3, wherein the MNLT transfers the arbitrary distributed variables into Chi-distributed variables.

5. The method according to claim 1, wherein the capillary waves are modeled using spherically invariant random processes, SIRP.

6. The method according to claim 1, wherein at least one input parameter for generating an adapted sea clutter simulation signal is applied to the physical simulation, and
wherein the input parameter is at least one of a wave height, a wave period, a range resolution, or a sampling rate.

7. A system for optimizing a detection threshold comprising:
a radar system;
a signal generator configured to generate a sea clutter simulation signal, wherein the signal generator comprises:
input means configured to obtain input parameters for adapting the sea clutter simulation signal;
processing means that is configured to:
model gravity waves using a physical simulation of a sea surface based on the obtained input parameters;
model capillary waves using stochastic processes, and
add the modeled capillary waves to the modeled gravity waves to generate the sea clutter simulation signal;
a memory unit configured to buffer data generated by the processing means; and
output means configured to provide the sea clutter simulation signal as a time-domain I/Q-data signal to the radar system.

8. The system according to claim 7, wherein the processing means is further configured to transform arbitrary distributed variables into Chi-distributed variables using an Memoryless-Nonlinear-Transformation (MNLT).

9. The system according to claim 7, wherein the stochastic processes comprise spherically invariant random processes (SIRP) that are applied to random-generated I/Q data.

10. The system according to claim 7, wherein the input means is a graphical user interface that is used to input the input parameter.

11. The system according to claim 7, wherein the processing means is further configured to obtain control data to provide different modes of the simulated sea clutter.

12. The system according to claim 11, wherein the modes are uncorrelated sea clutter mode, single range bin mode, single azimuth angle mode and spatial simulation mode.

13. The system according to claim 7, wherein the system is further configured to RF modulate the I/Q data signal based on a radar-systems input parameter, wherein the input parameter is at least one of a transmit power, a radar wavelength, an antenna beam width, a pulse length, a slant range, a transmitter gain, or a radar mode.

* * * * *